(12) United States Patent
Young (10) Patent No.: US 7,024,622 B1
(45) Date of Patent: Apr. 4, 2006

(54) KEEPING TRACK OF LOCATIONS IN ELECTRONIC DOCUMENTS

(75) Inventor: Jeffrey E. Young, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 505 days.

(21) Appl. No.: 08/980,110

(22) Filed: Nov. 26, 1997

(51) Int. Cl.
*G06F 15/00* (2006.01)

(52) U.S. Cl. ........................................ 715/530; 715/514
(58) Field of Classification Search ................ 707/514, 707/513, 515, 530; 715/513–514, 530
See application file for complete search history.

(56) References Cited

U.S. PATENT DOCUMENTS

| | | | | |
|---|---|---|---|---|
| 4,813,010 A | * | 3/1989 | Okamoto et al. | 707/517 |
| 4,996,665 A | * | 2/1991 | Nomura | 707/200 |
| 5,129,052 A | * | 7/1992 | Barker et al. | 707/514 |
| 5,146,552 A | | 9/1992 | Cassorla et al. | 707/512 |
| 5,237,681 A | * | 8/1993 | Kagan et al. | 707/104 |
| 5,247,437 A | * | 9/1993 | Vale et al. | 707/1 |
| 5,432,897 A | * | 7/1995 | Tatsumi et al. | 345/440 |
| 5,434,962 A | * | 7/1995 | Kyojima et al. | 707/513 |
| 5,483,629 A | * | 1/1996 | Motoyama et al. | 707/514 |
| 5,499,329 A | * | 3/1996 | Motoyama et al. | 707/513 |
| 5,535,318 A | * | 7/1996 | Motoyama et al. | 707/514 |
| 5,644,776 A | * | 7/1997 | DeRose et al. | 707/513 |
| 5,765,006 A | * | 6/1998 | Motoyama | 707/514 |
| 5,794,236 A | * | 8/1998 | Mehrle | 707/514 |
| 5,825,944 A | * | 10/1998 | Wang | 382/309 |
| 5,897,646 A | * | 4/1999 | Suda et al. | 715/530 |
| 5,897,648 A | * | 4/1999 | Henderson | 715/530 |
| 5,953,723 A | * | 9/1999 | Linoff et al. | 707/102 |
| 5,966,718 A | * | 10/1999 | Shibata | 707/530 |
| 6,038,573 A | * | 3/2000 | Parks | 707/513 |
| 6,098,072 A | * | 8/2000 | Sluiman et al. | 707/103 R |
| 6,199,098 B1 | * | 3/2001 | Jones et al. | 709/203 |
| 6,279,015 B1 | * | 8/2001 | Fong et al. | 715/523 |
| 6,374,271 B1 | * | 4/2002 | Shimizu et al. | 715/501.1 |

OTHER PUBLICATIONS

Chamberlin et al., Quill : an extensible system for editing documents of mixed type, IEEE Jan. 1998, pp. 317–326.*
L. R. Koster, "File Organization for Both Context and Line Number Editing", vol. 14, No. 7, Dec. 1971, IBM Technical Disclosure Bulletin, pp. 2175–2176.
J. Gutknecht, "Concepts of the Text Editor Lara," Communications of the ACM, vol. 28, No. 9, Sep. 1985, pp. 942–960.
J. Gutknecht, "Andra: The Document Preparation System of the Personal Woskstation Lilith," Software–Practice and Experience, vol. 14, 1984, pp. 73–100.
C. Rose et al., "The Memory Manager," Inside Macintosh, II–11–II–16, 1985, 5 pgs.
Ch.Crowley, "Data Structures for Text Sequences," University of New Mexico, Jun. 27, 1996, 8 pgs. downloaded from WWW.

* cited by examiner

*Primary Examiner*—Cong-Lac Huynh
(74) *Attorney, Agent, or Firm*—Fish & Richardson P.C.

(57) ABSTRACT

A method and an apparatus that keeps track of locations in an electronic file that is represented as a hierarchical data structure, generate a point dictionary to store points that point to locations, and generate point identifiers to access the points in the point dictionary. Point identifiers are stored by ancillary routines and with components in the electronic file's data structure. The points in the dictionary change as locations in the electronic file change, but the point identifiers do not change. The point identifiers stored with the components in the electronic file's data structure enable the method and the apparatus to retrieve other points in the same component without conducting a search through the point dictionary.

17 Claims, 6 Drawing Sheets

KEEPING TRACK OF LOCATIONS IN ELECTRONIC DOCUMENTS

BACKGROUND OF THE INVENTION

This invention relates to keeping track of locations in electronic files and in electronic documents.

An electronic document typically has information content (e.g., text, graphics, and tables), formatting content that specifies how to display the information content, and control content that affects the flow of the information content. An electronic document may reside on a digital computer storage medium. Electronic documents may be widely distributed and therefore viewed on a variety of hardware and software platforms.

Document publishing systems, including desktop publishing systems and word processing systems, use various techniques to keep track of locations in an electronic document. Some document publishing systems only keep track of the cursor location. Some systems have routines that perform distinct functions, such as a spell checker or a search tool. These routines may independently keep track of locations relevant to their specific functions. Other systems allow only one such routine to be active at one time, so that at any given time the system only needs to keep track of one set of locations.

It is known that locational data for one or more routines can be stored in a data structure, such as a list, and a routine can use an identifier to access the relevant locational data. The locational data in the data structure can be updated without affecting the identifier.

A document publishing system may refer to a location in an electronic document by using an absolute address, an offset from the beginning or other fixed point in the electronic document, or a line number and an offset. Another technique for indicating locations is to insert a token in the electronic document. The system recognizes the tokens because the tokens have specific delimiters (e.g., "<" and ">" used by the HyperText Markup Language). Inserting tokens is often inefficient because the system expends resources searching for the tokens. Furthermore, the system may not recognize an embedded token in the document and produce an error when the token is encountered.

SUMMARY OF THE INVENTION

The present invention relates to a computer-implemented method for keeping track of locations in an electronic file represented as a hierarchical data structure, by storing in a dictionary a plurality of points that point to a plurality of locations in the electronic file, producing a point identifier used by a routine to access a first point in the dictionary, and in response to a change in the electronic file, updating the first point to point to a current location.

The dictionary is used to store all points that indicate locations in the electronic file, and therefore, each routine does not need to update a set of points when an author modifies the content of an electronic file. This reduces the amount of processing that would otherwise be required and reduces the possibility of introducing errors into the system.

The electronic file is represented as a data structure having components and the point indicates the location in the electronic file using a component designation. One or more point identifiers are stored in a point identifier list with the component and the point identifier list is used to examine points in the dictionary without conducting a search through the dictionary for the points. When the electronic file is modified in such a way as to change the location from one component to another, the corresponding point identifier is removed from the first component's point identifier list and added to the second component's point identifier list, and the point in the dictionary is updated to reflect the change.

The process quickly finds and changes all entries in the dictionary that refer to a modified component because the list of point identifiers for each component eliminates the need to search the entire dictionary. The process also eliminates the need for routines to modify point identifiers when locations change due to editing changes.

BRIEF DESCRIPTION OF THE DRAWINGS

The foregoing features and other aspects of the present invention will become more apparent from the drawings taken together with the accompanying description, in which.

DETAILED DESCRIPTION

Figure 1:
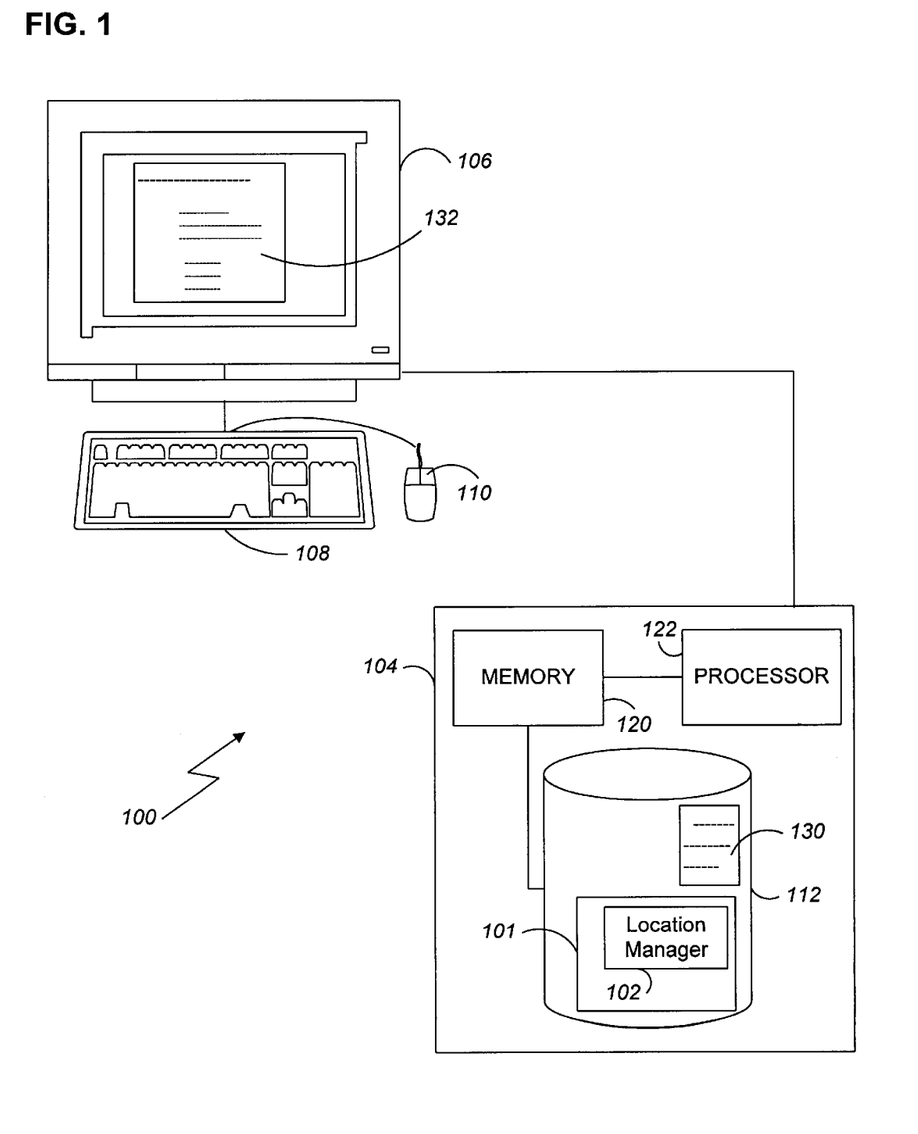
FIG. 1 is a block diagram of a computer platform suitable for supporting a location manager in accordance with the present invention.

FIG. 1 shows a computer platform 100 suitable for supporting an electronic document publishing system 101 that includes a location manager 102. (The electronic document publishing system 101 will be referred to as the document publishing system 101.) The computer platform 100 includes a digital computer 104, a display 106, a keyboard 108, a mouse or other pointing device 110, and a mass storage device 112 (e.g., hard disk drive, magneto-optical disk drive, or floppy disk drive). The computer 104 includes memory 120, a processor 122, and other customary components (e.g., memory bus and peripheral bus).

An electronic document 130 is stored on a hard disk or other computer-readable medium such as a diskette or CD ROM. The electronic document 130 is viewable in a human perceptible representation 132 on the display or as a hard-copy printout generated by a computer program.

The document publishing system 101 has one or more ancillary routines that perform different tasks. One ancillary routine may be a spell checker, another may generate an index from a set of index markers, and another may perform all tasks related to footnotes. The ancillary routines are not necessarily separate processes.

Ancillary routines may need to store data that keeps track of locations in an electronic document. For example, an author may interrupt an editing process by selecting a search process. The editor keeps track of the location of the editing position and the search process keeps track of that same location to mark the beginning position of the search. The search process also keeps track of a second location, which is the current search location in the electronic document. The search process completes when the current search location is the same as the starting location once again. During the search process, the author may insert, delete, or otherwise rearrange the content of the electronic document. If this occurs, the document publishing system 101 updates the data that the editor and the search process stored to keep track of the locations.

Figure 2:
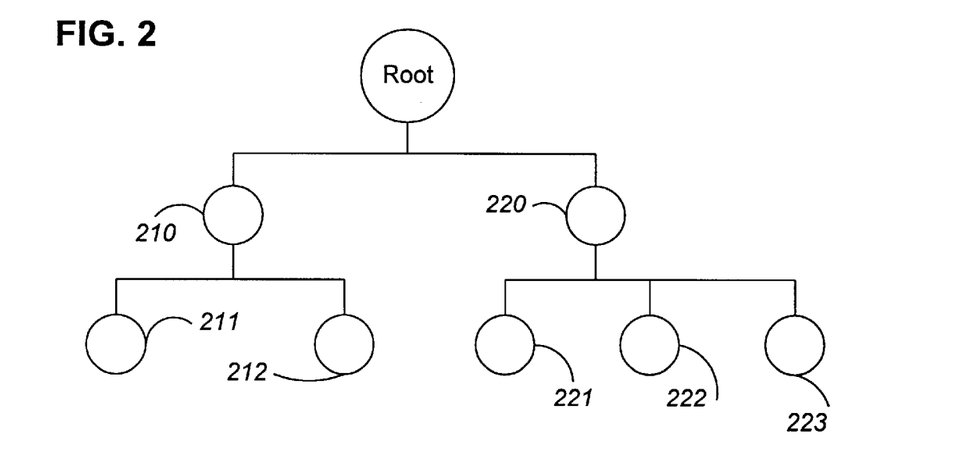
FIG. 2 is a diagram that shows a hierarchy of components in an electronic document.

Referring to FIG. 2, the document publishing system 101 organizes electronic documents as components in a hierarchical data structure. A component may be an object such as a chapter, section, or paragraph, although components are not limited to these types of objects. For example, component 210 and component 220 may be sections. Component 211 and component 212 may be paragraphs within component 210. Likewise, component 221, component 222, and component 223 may be paragraphs within component 220.

The document publishing system 101 keeps track of locations in an electronic document by storing data that points to the locations and updates that data as those locations change while the document is under development. The data that points to the locations will be referred to as "points." The points are stored in a central data structure called a point dictionary. Initially, the point dictionary may be an empty array in the computer's memory.

Figure 3:
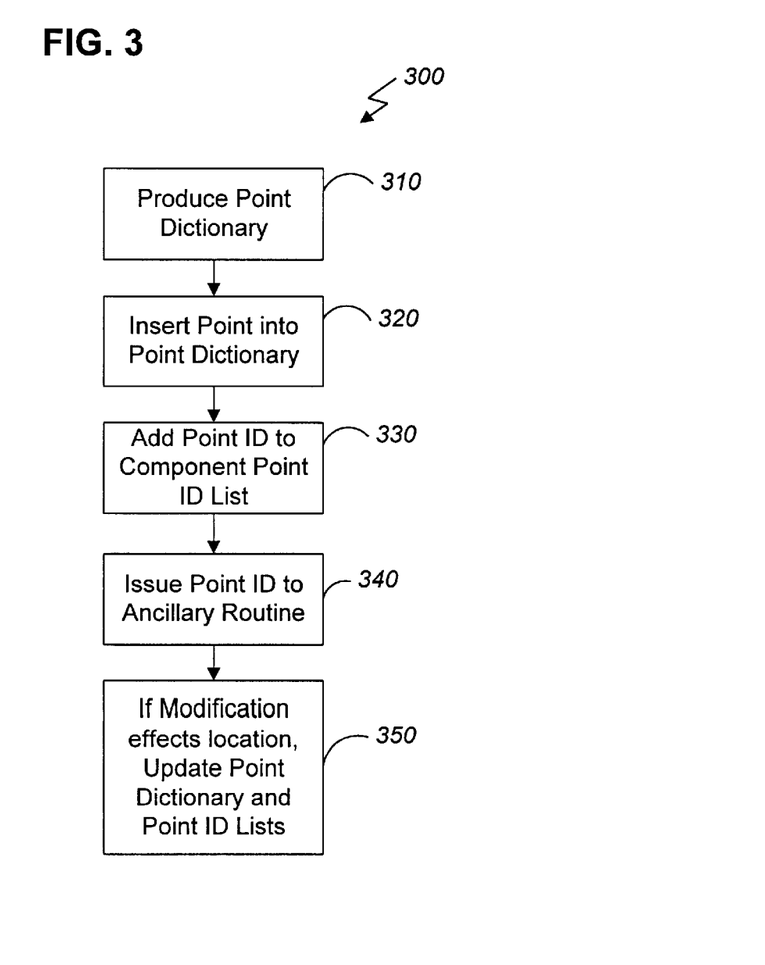
FIG. 3 is a flow chart of a method that creates and maintains a point dictionary and the entries in the point dictionary.

As shown in FIG. 3, the document publishing system 101 implements a location tracking method 300 that first produces a point dictionary (step 310). When the document publishing system 101 determines that a location may be needed at a later time, a point is inserted into the dictionary (step 320). This operation is typically instigated by an ancillary routine. For example, each time an author inserts a hypertext link into an electronic document, the document publishing system 101 may insert a point into the point dictionary.

The location tracking method 300 defines the points in the dictionary in terms of a relative location that includes a component identifier and an offset into the contents of the component. However, other embodiments may use different representations, such as an absolute value or a page number, line number, and an offset.

The method 300 provides point identifiers, also referred to as point IDs. The point IDs are added to a component point ID list in the component data structure (step 330), as will be discussed.

The point IDs enable ancillary routines to access points in the point dictionary. A point ID is issued to the ancillary routine (step 340). Each ancillary routine stores the point IDs relevant to its specific function and is responsible for managing its own point IDs. An ancillary routine may store the point IDs in any type of structure, for example variables or arrays.

While an author develops a document, the author may modify the content of the document. For example, the author may move an entire section or chapter to a new location, or insert and delete characters, footnotes, or index entries. As these types of operations occur, the method 300 updates all points in the point dictionary that are affected by the modification and, if necessary, updates the point ID lists (step 350), as will be discussed.

Figure 4:
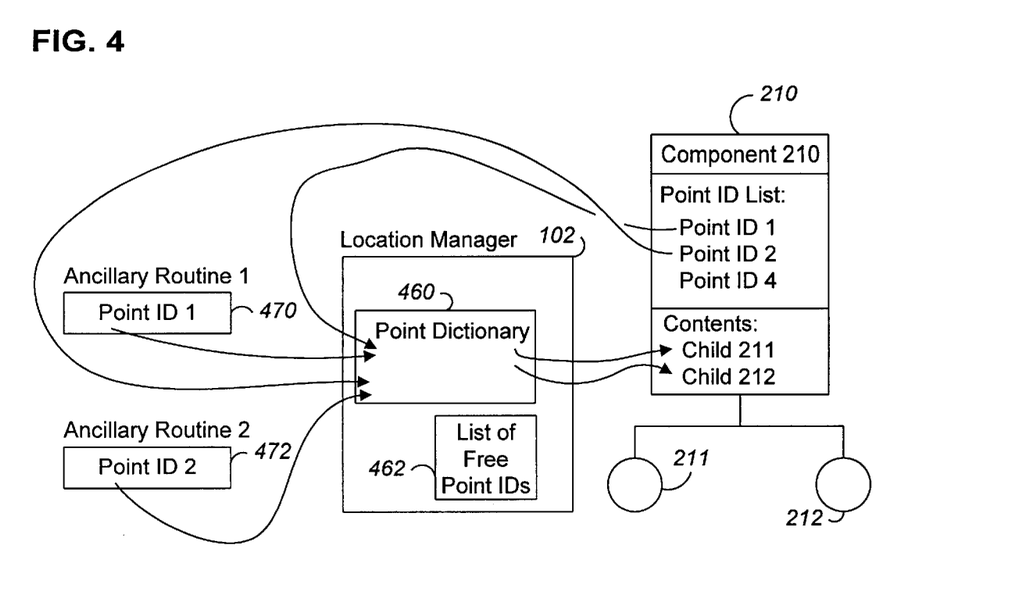
FIG. 4 is a block diagram depicting the relationship between a point dictionary and point IDs.

Referring to FIG. 4, information pertaining to each component in the electronic document is stored. For example, for component 210 the stored contents may include the identifiers for child components 211 and 212 (i.e., subordinate components). Contents for other components, for example component 211, may be paragraph text. Other stored information includes a point ID list to identify points that refer to locations in the component.

The component point ID lists provide an efficient mechanism to determine which points are affected when an electronic document is modified. The point IDs stored with the component identify the points in the point dictionary that may be affected by changes to the component. This eliminates the need to search the entire point dictionary to find points pointing to locations in a modified component.

A point stored in the point dictionary 460 identifies a component and specifies an offset in the component. Each point in the point dictionary is stored as a 64-bit word with the upper bits identifying the component and the lower bits specifying the offset. However, the word size is application dependent and may have any number of bits. The order in which the data is stored is also application dependent. An ancillary routine uses a point ID 470 to retrieve the component and offset that indicate where the location is. The point dictionary is a shared resource, so more than one ancillary routine has access to the dictionary using a point ID 472.

Figure 5:
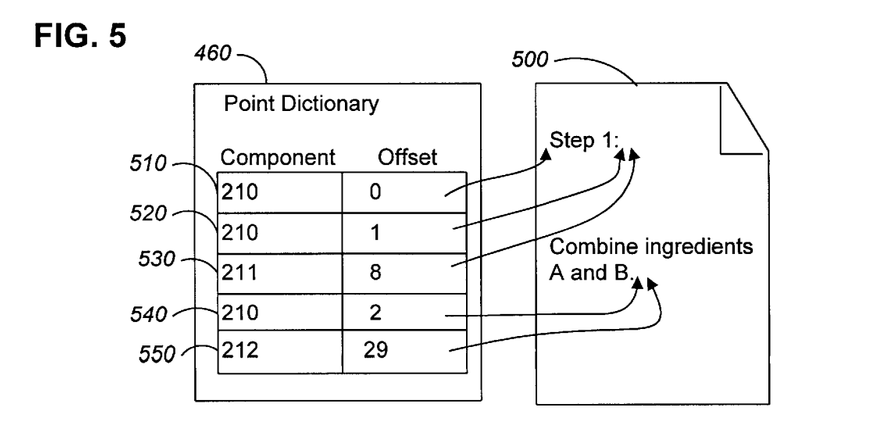
FIG. 5 is a block diagram of the relationship between the contents of a point dictionary and positions in an electronic document.

FIG. 5 shows an example of the relationship between points in the point dictionary 460 and locations in an electronic document 500. Three points in the point dictionary 460 point to component 210, which is the parent object to child components 211 and 212. The first point 510 points to the beginning of component 210 by using an offset of 0. The second point 520 points to the end of the first child component 211. (The seven-character string "Step 1:" is the contents of component 211.) Point 530 points to the same location as point 520, but specifies the location using component 211 and offset 8. The third point that points to component 210 is point 540. Point 540 points to the end of the second paragraph and the end of the second child component 212. Point 550 also points to the end of the second paragraph in the electronic document 500, but uses component 212 and offset 29 to do so.

When an ancillary routine no longer needs a point, the routine may request that the point be deleted from the point dictionary. To delete a point from the point dictionary, the document publishing system 101 adds the point ID to a list of free point IDs 462 (FIG. 4).

When adding a point to the point dictionary, the document publishing system 101 checks the list of free point IDs 462 for a re-usable entry in the point dictionary. If no entries are re-usable, the document publishing system 101 adds the point to the end of the point dictionary. Rather than an array and a free list, other data structures may be used to implement the point dictionary, for example, a hash table or linked list.

Figure 6:
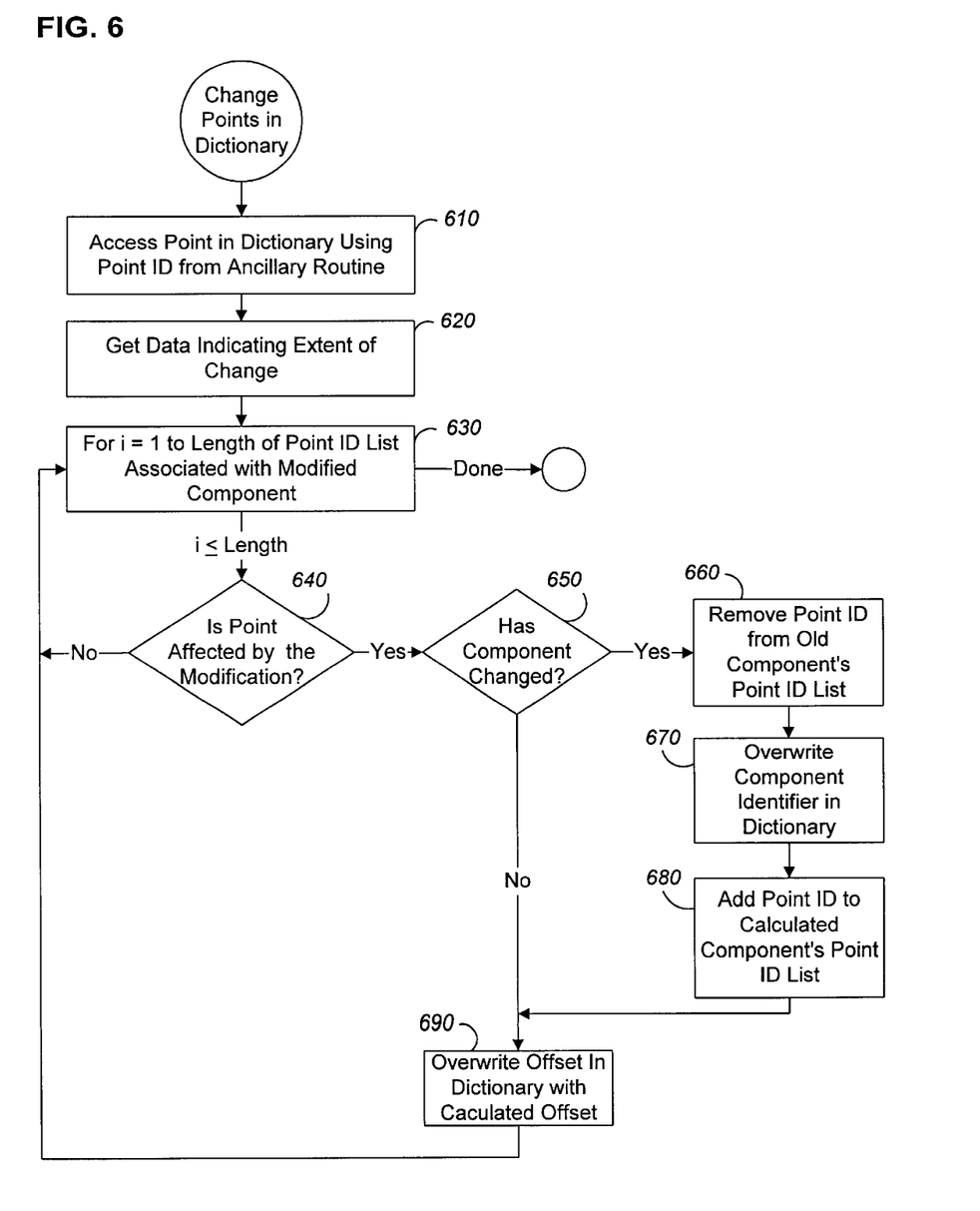
FIG. 6 is a flow chart of a method for updating points in a point dictionary.

FIG. 6 shows how points in the point dictionary are changed. Typically, an ancillary routine makes a modification that may change many locations in the electronic document and the ancillary routine issues a request to the location manager 102 to update all affected points in the point dictionary. The location manager 102 uses a point ID from the ancillary routine to access a point in the point dictionary (step 610). That point will be referred to as the change point and corresponds to the location of the modification. The location manager 102 also obtains, from the ancillary routine, data that specifies the extent of the change (step 620), for example data indicating the number of characters added or deleted.

The location manager 102 uses the change point to obtain the point ID list associated with the component of the change point. The point ID list is used to obtain points in the point dictionary. For each point in the point ID list (step 630), the points are compared with the data indicating the extent of the change to determine whether the points are affected by the modification (step 640). For example, if characters were added, any point having an offset greater than the offset of the change point is affected by the modification.

If a point is affected by the modification, a new component and offset are calculated to reflect the current location. The component of the affected point is compared to the component of the change point to determine whether the component changed (step 650). If the component changed, the point ID for the affected point is removed from the old component's point ID list (step 660). The component identifier in the point dictionary is overwritten with the calculated component identifier (step 670). The point ID for the affected point is added to the point ID list for the calculated component (step 680), using the method shown in FIG. 7. Whether or not the location changed from one component to another, the location manager 102 overwrites the old offset in the dictionary with the calculated offset (step 690).

Each component has space allocated for a point ID list. In one embodiment, point IDs are always inserted into the first free slot in the component's point ID list. Any slot containing a "0" is free and all free slots are at the end of the list.

Figure 7:
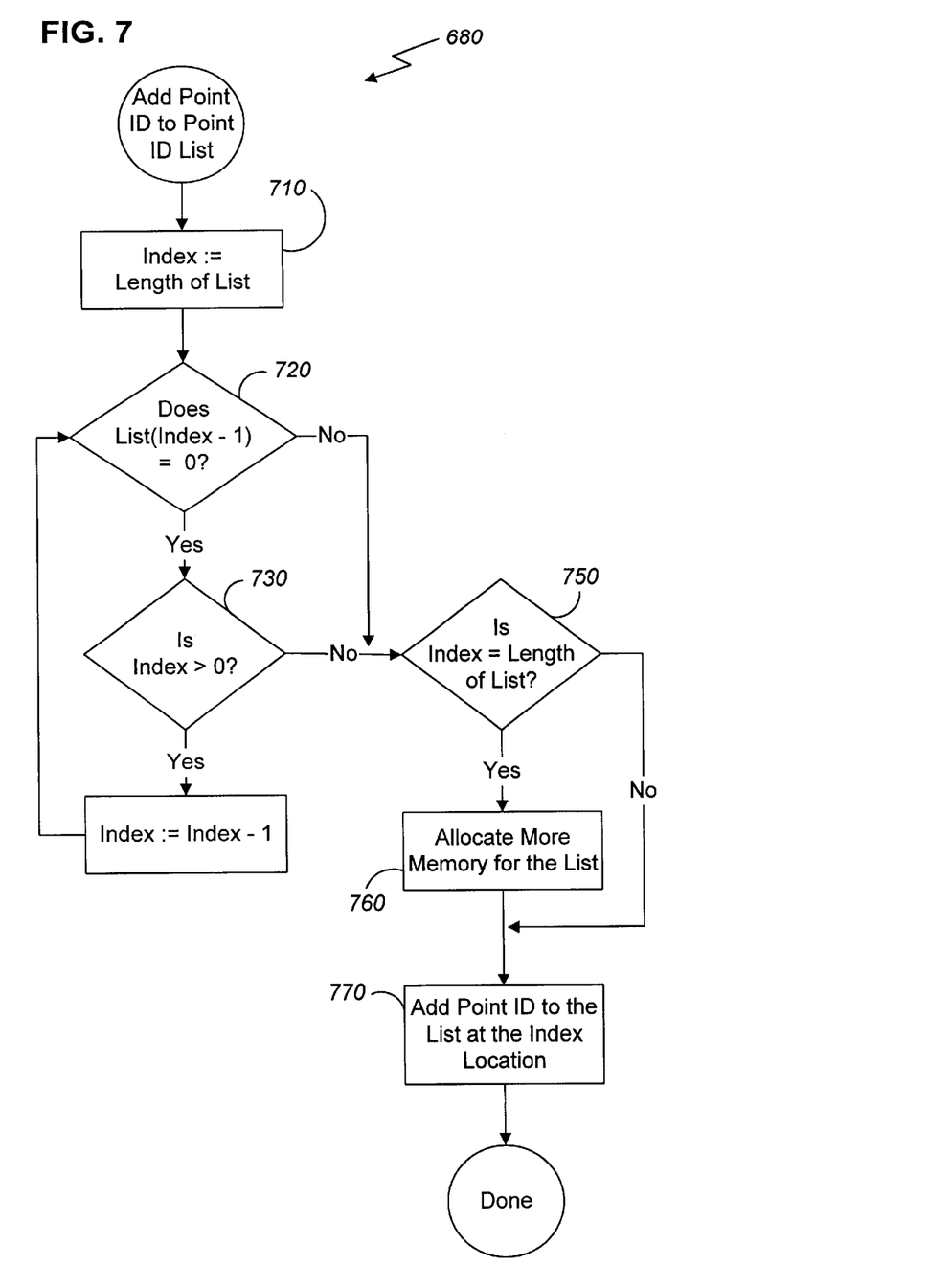
FIG. 7 is a flow chart of a method for adding a point to a component's point ID list.

Referring to FIG. 7, a method 680 that adds a point to a point ID list, searches for the first free slot beginning at the end of the point ID list (step 710). If the contents of List (Index-1) is 0 (step 720) and the index is greater than 0 (step 730), the content of the preceding slot is checked. After the first free slot is found, the method 680 ensures that the list has adequate space to add the point ID (step 750) and allocates more memory if needed (step 760). As a final step, the point ID is added to the point ID list in the first free slot (step 770).

Figure 8:
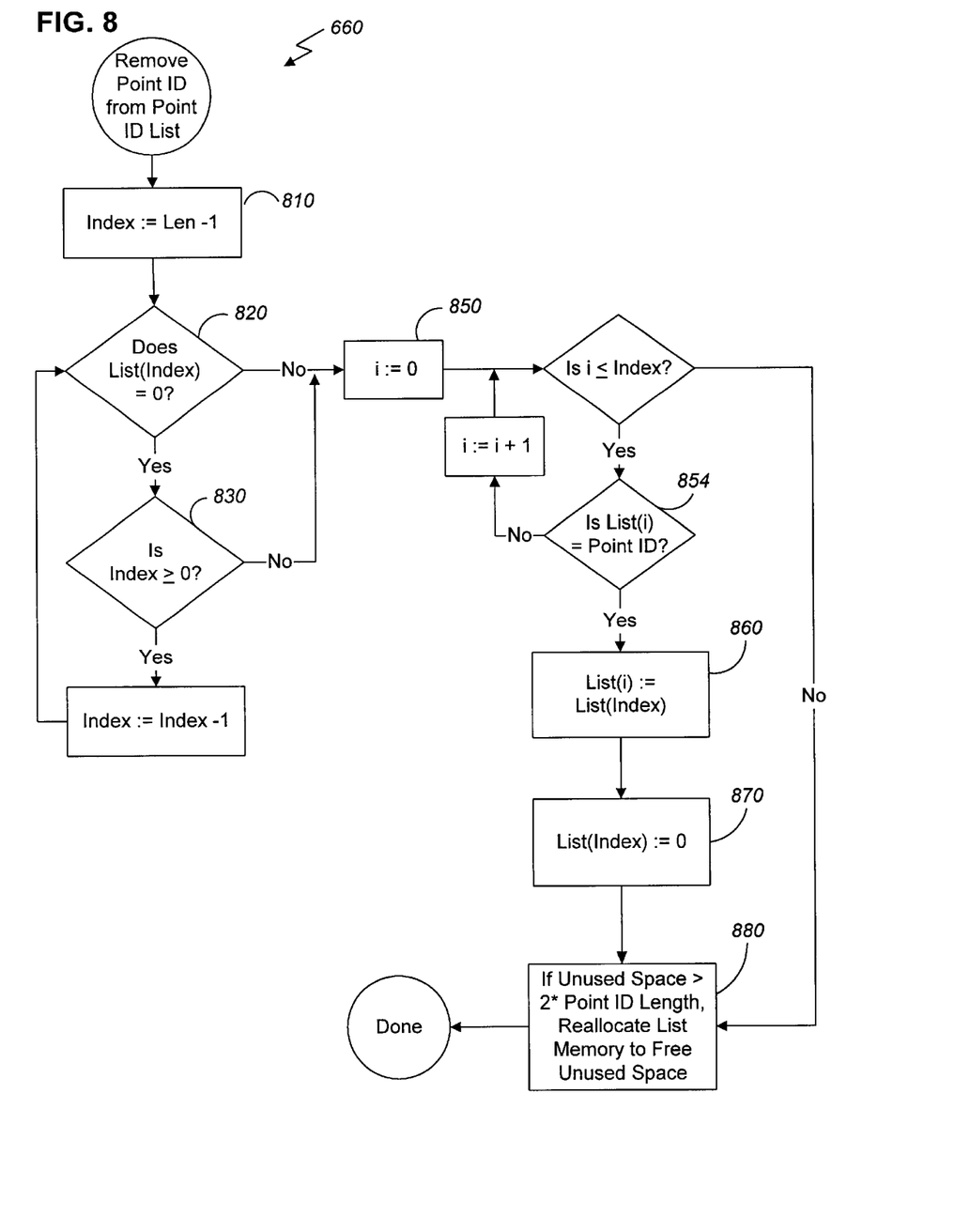
FIG. 8 is a flow chart of a method for removing a point from a component's point ID list.

Referring to FIG. 8, a method 660 that removes a point ID from a point ID list overwrites the point ID with the last point ID in the list and places a 0 where the last point ID was found. This ensures that unused slots are always at the end of a point ID list.

The method 660 finds the last point ID in a point ID list by beginning the search at the end of the point ID list (step 810). The content of the point ID list at the index is compared to 0 (step 820). The search continues as long as the content is 0, meaning that the slot is empty, and as long as the index is greater than or equal to 0 (step 830).

After finding the last point ID in the point ID list, the method 660 searches the point ID list for the point ID to remove beginning at the first slot in the point ID list (step 850). If the method 660 finds the point ID to remove (step 854), the method 660 overwrites that point ID with the point ID from the last used slot (step 860). The last used slot is freed by setting its content to "0" (step 870). As a final step, the method 660 ensures that the point ID list only has enough space to add two more point IDs (step 880). This final step conserves memory by allocating a minimum amount of space while considering the speed of the method by not reallocating memory each time the method removes a point ID.

Other embodiments are within the scope of the following claims. For example, the order of performing steps of the invention may be changed and still achieve desirable results. The internal organization of the electronic document does not need to be a hierarchical structure. The invention can store the point in a variety of formats, such as a pointer to a line and an offset into the line.

What is claimed is:

1. A computer-implemented method for keeping track of locations in an electronic file, comprising:

storing, in a dictionary, a plurality of points each representing a location in an electronic file, the electronic file being comprised of a data structure having a hierarchy of components;

representing each location by containing in each point a component designation and a location pointer which identifies a location within the designated component;

producing a point identifier used by a routine to access a first point in the dictionary;

using the point identifier to find the first point in the dictionary; and in response to a change in the electronic file, updating the first point to point to a current location.

2. The method of claim 1, further comprising:

storing the point identifier with a component identifier.

3. The method of claim 1, further comprising:

storing a plurality of point identifiers in a point identifier list associated with a component.

4. The method of claim 3, wherein:

the first point indicates the component and an offset.

5. The method of claim 4, further comprising:

storing additional point identifiers in a point identifier list with the point identifier; and using the point identifier list to retrieve points in the dictionary without conducting a search through the dictionary.

6. The method of claim 5, further comprising:

storing the point identifier with a component identifier of the component of the data structure.

7. The method of claim 5, further comprising:

storing a plurality of point identifiers in a point identifier list associated with a component.

8. A computer-implemented method for keeping track of locations in an electronic document, comprising:

storing, in a list, a plurality of points representing locations in an electronic document comprised of a data structure having a hierarchy of components, as requested by a plurality of computer processes;

using a component designation in each point to represent each location;

generating a plurality of indices for the plurality of points;

storing the plurality of indices with the respective computer processes to facilitate retrieval of the plurality of points;

using the plurality of indices to retrieve one or more points of the plurality of points; and updating, in response to a change in the electronic document, the plurality of points as the locations change.

9. The method of claim 8, further comprising:

storing the indices with component identifiers of the components of the data structure that contain the corresponding locations.

10. A computer program, residing on a computer-readable medium, comprising instructions causing a computer to:

store, in a dictionary, a point for a location in an electronic file represented as a hierarchical data structure having components;

designate a component with the point;

produce a point identifier that a routine uses to access the point in the dictionary;

use the point identifier to find the point in the dictionary; and in response to a change in the electronic file, update the point in the dictionary.

11. The computer program of claim 10, further comprising instructions causing a computer to:

store the point identifier with a component identifier of the component of the hierarchical data structure that contains the location.

12. The computer program of claim 10, further comprising instructions causing a computer to:

store a plurality of point identifiers in a point identifier list associated with a component.

13. The computer program of claim 10, wherein the electronic file is an electronic document used by a document publishing system.

14. The computer program of claim 13, further comprising instructions causing a computer to:

store the point identifier with a component identifier of the component of the hierarchical data structure that contains the location.

15. The computer program of claim 13, further comprising instructions causing a computer to:

store a plurality of point identifiers in a point identifier list associated with the component.

16. A computer program, residing on a computer-readable medium, comprising instructions causing a computer to:

use an electronic document represented as a data structure having a hierarchy of components;

store, in a list, a plurality of points representing locations in the electronic document by designating each location in terms of a component, as requested by a plurality of computer processes;

generate a plurality of indices for the plurality of points;

store the plurality of indices with the respective computer processes to facilitate retrieval of the plurality of points;

use the plurality of indices to retrieve one or more points of the plurality of points in the list; and update the plurality of points in response to a change in the electronic document while not changing the plurality of indices.

17. The computer program of claim 16, further comprising instructions causing a computer to:

store the indices with a component identifier of the components of the data structure that contain the location.

* * * * *

UNITED STATES PATENT AND TRADEMARK OFFICE
CERTIFICATE OF CORRECTION

Page 1 of 1

| | |
|---|---|
| PATENT NO. | : 7,024,622 B1 |
| APPLICATION NO. | : 08/980110 |
| DATED | : April 4, 2006 |
| INVENTOR(S) | : Jeffrey E. Young |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Second Day of October, 2012

David J. Kappos
*Director of the United States Patent and Trademark Office*